United States Patent [19]

McLoughlin et al.

[11] 4,044,555
[45] Aug. 30, 1977

[54] REAR SECTION OF JET POWER PLANT INSTALLATIONS

[75] Inventors: William G. McLoughlin; Arnold V. Pilling; John Reardon; William E. Addison, all of Birmingham, Ala.

[73] Assignee: Hayes International Corporation, Birmingham, Ala.

[21] Appl. No.: 765,700

[22] Filed: Sept. 30, 1958

[51] Int. Cl.$^2$ .............................................. F02K 3/04
[52] U.S. Cl. ....................................... 60/264; 60/265; 60/271; 239/127.3
[58] Field of Search ..................... 60/35.6, 39.66, 264

[56] References Cited

U.S. PATENT DOCUMENTS

| | | | |
|---|---|---|---|
| 2,591,676 | 4/1952 | Clayton | 60/39.66 |
| 2,620,623 | 12/1952 | Imbert | 60/230 |
| 2,785,878 | 3/1957 | Conrad | 60/39.66 |
| 2,789,416 | 4/1957 | Mirza | 60/266 |
| 2,811,827 | 11/1957 | Kress | 60/261 |
| 2,825,204 | 3/1958 | Kadosch et al. | 60/263 |
| 2,857,119 | 10/1958 | Morguloff | 60/229 |

FOREIGN PATENT DOCUMENTS 469,231  11/1950  Canada

Primary Examiner—Samuel Feinberg

EXEMPLARY CLAIM

1. In a gas turbine engine having blades and an exhaust tailpipe, the combination of an exhaust cone axially mounted within the tailpipe and having its rearward end adjacent the discharge opening of the exhaust pipe with substantially all of the externally viewable surfaces of said exhaust cone formed of porous stainless steel material, means to supply cooling air to the interior of the cone for venting thereof through said porous material, a hollow strut member of airfoil configuration spanning the annular gas passageway between the exhaust tailpipe and the said cone with substantially all of the externally viewable surfaces of said strut member formed of stainless steel material, means to supply cooling air to the interior of said hollow strut member, means to pass cooling air in heat interchange relation with the outer surface of substantially all parts of the exhaust tailpipe whose related inner surface is externally viewable, and a constriction in the exhaust tailpipe located downstream of the hot parts of the engine and serving with the exhaust cone to conceal the hot parts of the engine from external view, whereby the detectible infrared emission of the engine is substantially reduced.

7 Claims, 3 Drawing Figures

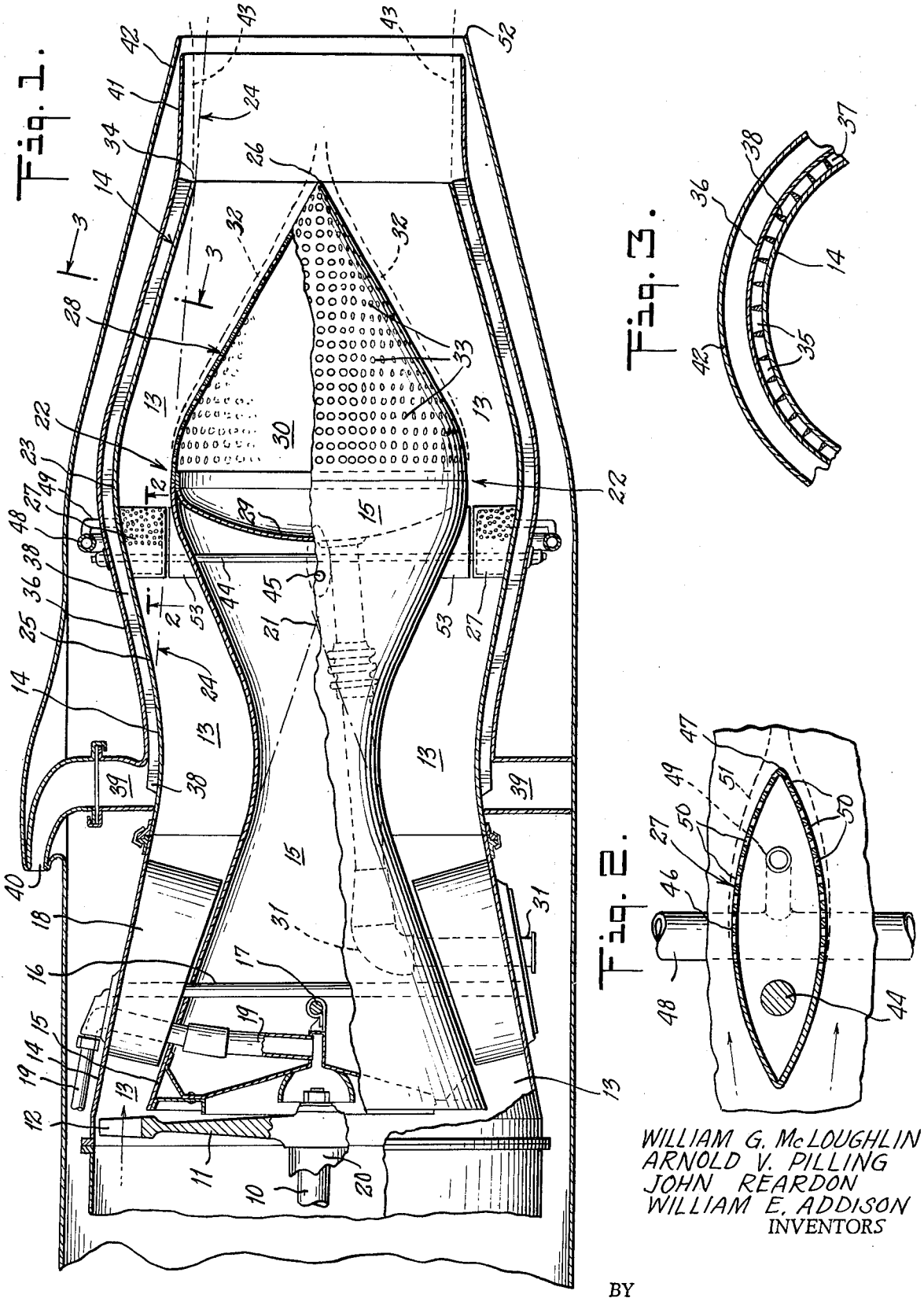

REAR SECTION OF JET POWER PLANT INSTALLATIONS

This invention relates to infra-red protective devices for aircraft utilizing gas turbine engines. Its primary purpose is to reduce the total infra-red radiation emitted by the power plant installation and thus to decrease the probability of detection by infra-red sensitive detection systems.

One of the objects of the invention is to provide a physical construction of the engine and particularly of its aft-end parts which will completely shield from view, from outside the nacelle, all high temperature parts of the engine which cannot be cooled without seriously degrading engine performance.

Another object is to provide for transpirational or convectional cooling by internal and/or external air of all metallic and other hot engine parts which can be cooled without seriously degrading engine performance and which are visible from outside the nacelle, to an extent sufficient to greatly curtail or eliminate their detectability by infra-red detection systems.

Another object is to reduce in large part or eliminate altogether the infra-red reflectivity of surfaces which would otherwise provide reflection of infra-red radiant energy originating within the needle.

The above and other objects are accomplished, according to the present invention, by providing means to shield from direct line-of-sight view the hot metal parts within the nacelle, especially turbine blades, to maintain at relatively low temperature by means of transpirational or convectional cooling air those hot metal parts which cannot be shielded from external line-of-sight view; to provide a layer of air which prevents transfer of excessive heat to external nacelle fairings normally heated by the gaseous plume exhausted by a gas turbine engine; and to reduce or prevent reflection of infra-red radiant energy, originating in hot metal parts within the nacelle, at undesirable aspects.

In order to illustrate the invention, which is more exactly defined in the appended claims, there is here disclosed for purposes of illustration and not by way of limitation one form of device embodying the invention.

In the attached drawings:

FIG. 1 is a longitudinal sectional view of the aft-end of a gas turbine engine embodying this invention, the turbine wheel 11 being at the left and the exit to atmosphere of the exhaust gases being at the right;

FIG. 2 is a horizontal section on the line 2—2 of FIG. 1; and

FIG. 3 is a near-vertical section on the line 3—3 of FIG. 1.

A number of infra-red radiation detection devices are known. These devices have varying degrees of sensitivity throughout the infra-red spectrum. They are dependent for effectiveness upon the total power of radiation from a given source and upon its spectral distribution. For present purposes it can be assumed that the radiation characteristics of the hot metal parts of a gas turbine engine exhaust system are essentially the same in character as those of a gray body. The power of infra-red radiation emitted by a gray body is proportional to the fourth power of its absolute temperature. Hence, small reductions in the absolute temperature of the gray body result in large reductions in the emitted, or detectable, radiation thereof. By way of example, the principal infra-red detectors are about 10 times as sensitive to radiation from metal surfaces at 1200° F. as they are to radiation from metal surfaces at 600° F. Actually a reduction in temperature of about 200° F. in any visible metal surface exposed directly to hot discharge gases in gas turbine engines achieves a significant degree of freedom from detection.

It follows that it is desirable, from an infra-red detection countermeasures point of view, to reduce as far as engine performance will permit the temperature of all radiating surfaces which may be directly viewed from outside an engine nacelle, and to shield from direct view all hot parts, such as turbine blades, which cannot be reduce in temperature because of operational considerations. Since the wave-length of radiant energy reflected from a gray body surface is predominantly governed by the temperature of the surface, and not by the wave length of the incident radiation, reduction in temperature of surfaces which may be directly viewed from outside an engine nacelle serve also to reduce the detectability of infra-red radiation originating in hot parts within the engine and reaching space outside the engine by reflection from such surfaces.

Referring to FIG. 1, in the ordinary gas turbine engine the rearward end of the main shaft 10 supports a turbine wheel 11 supported by bearing 20. On wheel 11 are mounted a series of turbine blades 12. It will be understood that the main shaft 10 extends forwardly through the engine where it carries a series of blades (not shown) for supplying highly compressed air to the combustion chambers (not shown). The combustion gases produced in the combustion chambers discharge rearwardly past blades 12 and enter the annular passageway 13, imparting some energy to the blades 12 for driving the shaft 10. In conventional engines of this type, as presently known and used, the annular passageway 13 is defined by the space between outer exhaust pipe 14 and inner body 15. Support for inner body 15 is provided by fixed bars 16, 17 anchored externally of exhaust pipe 14 and penetrating inner body 15 at right angles to each other. Where these bars cross annular passageway 13 they are customarily provided with protective struts 18 of airfoil configuration. Such struts may also protect the air pipe 19 through which air is fed, from the compressor or other source, to cool the bearing 20. In tail cone assemblies heretofore known and used the inner body 15 is conical in shape, tapering to a point indicated generally at 21, and the outer exhaust pipe 14 terminates at or a little aft of the vertical plane containing point 21.

In a tail cone assembly made according to the present invention, here described for purposes of illustration, the inner body 15 is provided with an enlarged portion 22 towards its aft end, and in the plane of maximum diameter of portion 22 the outer exhaust pipe 14 is correspondingly enlarged in diameter at 23. The enlargement in diameter is such that the direct line-of-sight 24, from a point outside the engine, does not reach hot metal parts thereof such as the blades 12 or struts 18. Consequently, shielding is provided so that no free path is available by which infra-red radiation originating in these hot metal parts can travel directly to points outside the engine. Consequently, the only metal surfaces visible outside the engine, more particularly from any point aft thereof, are the inner surfaces of exhaust pipe 14 from approximately the point indicated at 25 to the rear end thereof, and the outer surface of body member 15 from approximately the region of its greatest diameter 22 to its rearward pointed end 26, plus the auxiliary struts 27 mentioned below.

Rearwardly of enlarged portion 22, the inner body 15 consists of a conical member 28 terminating in pointed end 26. A diaphragm 29 secured within body 15 approximately at its enlarged portion 22 serves to seal the interior of conical member 28 from communication with the rest of the engine exhaust system, and forms an air chamber 30 within conical member 28. Air may be supplied to chamber 30 by air pipe 31 which conducts air to chamber 30 from a source (not shown) which may be the compressor of the engine. The conical member 28 is formed of any high temperature resistant material, for example, stainless steel, which is made porous to provide for the passage of air from within chamber 30 through the cone to exhaust gas passageway 13 where, in ordinary operation, a blanket 32 of air supplied from within cone 28 is interposed between the outer surface of the cone and the current of hot exhaust gases passing between body 15 and pipe 14.

According to the preferred form of this invention cone 28 is formed of stainless steel sheet containing a large number of small perforations 33 which are selectively distributed over the entire surface of the cone and permit continuous flow of air from chamber 30 to blanket 32 over substantially the entire area of the cone. Cone 28 may also be made of other materials capable of withstanding high temperature and of permitting the passage of air from chamber 30. For example, cone 28 may be of woven wire mesh stainless steel construction or stainless steel wool compressed and densified under heat to form a porous rigid body having the requisite characteristics.

While the exposed inner surface of exhaust pipe 14, for approximately the point 25 to the rearward end 34 thereof, may be cooled in similar manner to that of cone 28 by the provision of porous heat-resistant material, it is preferred to cool the same by conduction of heat from exhaust pipe 14 to, and its dissipation in, streams of air 35 (see FIG. 3) moving in contact with the outer surface of exhaust pipe 14, which air also serves a further purpose in protecting the extended skirt and fairings to be described.

Surrounding at least all parts of exhaust pipe 14 which are visible from outside the engine nacelle, and approximately equi-distant therefrom at all points, there is provided a shell 36. Within the annular space 37 (FIG. 3) between shell 36 and exhaust pipe 14, are positioned a plurality of radial fins 38 brazed or welded to the outer surface of exhaust pipe 14 and forming between adjacent pairs of such fins spaces 35 through which streams of air are guided longitudinally of the engine in contact with the outer surface of pipe 14 and also in contact with fins 38. This construction affords an efficient means for conducting heat from exhaust pipe 14 and dissipating it into moving streams of air in spaces 35, thus substantially reducing the surface temperature of pipe 14.

Air may be fed to the spaces 35 from any suitable source. As here shown, a plenum 39, surrounding exhaust pipe 14 at approximately its mid-point, is supplied with air from any suitable source, for example an external scupper 40, and the plenum 39 provides a source of air for all of the spaces 35.

Fins 38 are provided for all parts of exhaust pipe 14 which may be seen by line-of-sight from any point aft of the engine, that is, around all parts of pipe aft of the point 25. For safety and convenience, as shown in FIG. 1, the plenum 39 is located a little forward of point 25, and the forward ends of fins 38 are located in the plenum, thus extending the range of cooling action some distance forward of point 25.

Aft of the rearward end 34 of exhaust pipe 14 the shell 36 extends rearwardly to form a cylindrical skirt 41 whose purpose is to guide the plume of hot gases to the atmosphere and to protect the cowl fairing 42 from becoming overheated. Skirt 41 is prevented from becoming overheated for the reason that the streams of air emerging from spaces 35 at the rearward end 34 of the exhaust pipe merge to form a continuous annular layer of air 43 in contact with the inner surface of skirt 41 and interposed between it and the stream of hot exhaust gases.

The rearward portion of inner body 15, particularly cone 28, is supported structurally from shell 36 and exhaust pipe 14 by fixed bars 44 and 45 at right angles to each other. In order to protect these bars from the hot engine gases, auxiliary struts 27 (see also FIG. 2) of airfoil configuration are provided. Since the rearward aspect of these struts, from approximately their thickest mid-portion 46 to their rearward pointed edges 47, is visible by line-of-sight from points outside the engine nacelle, provision is made to cool at least these surfaces. For this purpose air, from any suitable source as for example the compressor, passes from circular supply pipe 48 and feed pipes 49 into the interior of auxiliary struts 27. The rearwardly facing surfaces of the struts, that is from about mid-point 46 to edge 47, are made of porous heat-resistant material which may be similar to that of which cone 28 is made. Thus air introduced to the interior of struts 27 is permitted to pass through the material of which the strut is made, for example, through perforations 50, thus forming a layer of air 51 which is interposed between the hot gases and the material of which the strut is made and prevents the visible portion of the strut from rising to an objectionably high temperature.

The space between each strut 27 and the wall of inner body 15 is preferably filled with a lug 53 of the same outer air foil configuration as strut 27. The lugs 53 serve to close the inner ends of hollow strut 27 and reenforce the support of the inner body by means of fixed bars 44 and 45. The lugs 53, which are not visible by line-of-sight from points outside the nacelle, need not be cooled to the same degree as struts 27 but will be reduced in temperature to some extent by the air supplied to struts 27.

The engine as a whole may be enclosed within a suitable cowl fairing 42 having its rear end at 52, immediately adjacent to the rear end of skirt 41. The arrangement at this point is such that the layer of air 43 in contact with, and serving to protect, skirt 41, also serves to protect from overheating the extreme rear end 52 of fairing 42.

The particular construction here shown, while presently believed to be the best form of device now known for the intended purpose, is set forth for purposes of illustration only, and not with any intention of limiting the invention, whose scope is set forth in the claims appended hereto.

We claim:

1. In a gas turbine engine having blades and an exhaust tailpipe, the combination of an exhaust cone axially mounted within the tailpipe and having its rearward end adjacent to discharge opening of the exhaust pipe with substantially all of the externally viewable surfaces of said exhaust cone formed or porous stainless steel material, means to supply cooling air to the interior of the cone for venting thereof through said porous material, a hollow strut member of airfoil configuration spanning the annular gas passageway between the exhaust tailpipe and the said cone with substantially all of the externally viewable surfaces of said strut member formed of stainless steel material, means to supply cooling air to the interior of said hollow strut member, means to pass cooling air in heat interchange relation with the outer surface of substantially all parts of the exhaust tailpipe whose related inner surface is externally viewable, and a constriction in the exhaust tailpipe located downstream of the hot parts of the engine and serving with the exhaust cone to conceal the hot parts of the engine from external view, whereby the detectible infrared emission of the engine is substantially reduced.

2. An engine as described in claim 1 wherein the externally viewable surfaces of the strut member are formed of stainless sheet steel having a multiplicity of closely-spaced perforations therein.

3. An engine as described in claim 1 wherein the externally viewable surfaces of the strut member are formed of woven stainless steel wire mesh.

4. An engine as described in claim 1 wherein the externally viewable surfaces of the strut member are formed of compressed stainless steel wool.

5. In a gas turbine engine having blades and an exhaust tailpipe, the combination of an exhaust cone axially mounted within the tailpipe and having a pointed end adjacent the discharge opening of the exhaust pipe with substantially all of the externally viewable surfaces of said exhaust cone formed of stainless sheet steel having a multiplicity of closely-spaced perforations therein, means to supply cooling air to the interior of the cone for venting thereof through said perforations, a hollow strut member of airfoil configuration spanning the annular gas passageway between the exhaust tailpipe and the said cone with substantially all of the externally viewable surfaces of said strut member formed of porous stainless steel material, means to supply cooling air to the interior of said hollow strut member for venting thereof through said porous material, and means to pass cooling air in heat interchange relation with the outer surface of substantially all parts of the exhaust tailpipe whose related inner surface is externally viewable, and a constriction in the exhaust tailpipe located downstream of the hot parts of the engine and serving with the exhaust cone to conceal the hot parts of the engine from external view, whereby the detectible infrared emission of the engine is substantially reduced.

6. In a gas turbine engine having blades and an exhaust tailpipe, the combination of an exhaust cone axially mounted within the tailpipe and having a pointed end adjacent the discharge opening of the exhaust pipe with substantially all of the externally viewable surfaces of said exhaust cone formed of woven stainless steel wire mesh, means to supply cooling air to the interior of the cone for venting thereof through said wire mesh, a hollow strut member of airfoil configuration spanning the annular gas passageway between the exhaust tailpipe and the said cone with substantially all of the externally viewable surfaces of said strut member formed of porous stainless steel material, means to supply cooling air to the interior of said hollow strut member for venting thereof through said porous material, and means to pass cooling air in heat interchange relation with the outer surface of substantially all parts of the exhaust tailpipe whose related inner surface is externally viewable, and a constriction in the exhaust tailpipe located downstream of the hot parts of the engine and serving with the exhaust cone to conceal the hot parts of the engine from external view, whereby the detectible infrared emission of the engine is substantially reduced.

7. In a gas turbine engine having blades and an exhaust tailpipe, the combination of an exhaust cone axially mounted within the tailpipe and having a pointed end adjacent the discharge opening of the exhaust pipe with substantially all of the externally viewable surfaces of said exhaust cone formed of compressed stainless steel wool, means to supply cooling air to the interior of the cone for venting thereof through said steel wool, a hollow strut member of airfoil configuration spanning the annular gas passageway between the exhaust tailpipe and the said cone with substantially all of the externally viewable surfaces of said strut member formed of porous stainless steel material, means to supply cooling air to the interior of said hollow strut member for venting thereof through said porous material, and means to pass cooling air in heat interchange relation with the outer surface of substantially all parts of the exhaust tailpipe whose related inner surface is externally viewable, and a constriction in the exhaust tailpipe located downstream of the hot parts of the engine and serving with the exhaust cone to conceal the hot parts of the engine from external view, whereby the detectible infrared emission of the engine is substantially reduced.

* * * * *